United States Patent Office 3,308,058
Patented Mar. 7, 1967

3,308,058
SEPARATION PROCESSES USING MOLECULAR SIEVES
Clive Leonard Hicks, Sunbury-on-Thames, England, assignor to The British Petroleum Company Limited, London, England, a corporation of England
No Drawing. Filed June 18, 1964, Ser. No. 376,218
Claims priority, application Great Britain, July 12, 1963, 27,686/63
2 Claims. (Cl. 208—310)

This invention relates to separation processes using molecular sieves and particularly to processes for the separation of straight chain hydrocarbons from petroleum fractions.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 4 A. to 15 A. or more in diameter, but in any one zeolite the pores will be of substantially uniform size.

It has previously been proposed to treat petroleum fractions ranging from gasoline to gas oil and higher with molecular sieves having pore diameters ranging from 4 A. to 15 A. In order to separate straight chain hydrocarbons from branched chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight chain material may also be recovered as a product if desired. For example, a process suitable for separating normal paraffins from petroleum fractions boiling in the $C_{10}$–$C_{20}$ range is described in our co-pending U.K. patent application No. 3,965/61.

According to the present invention, a process employing a 5 A. molecular sieve for the separation of straight chain hydrocarbons from petroleum fractions wherein the feedstock contains discrete, iron-containing particles, the feedstock is contacted in a pre-treatment zone with a filter to remove said discrete, iron-containing particles.

It has been found that the presence of iron-containing particles in hydrocarbon feedstocks to molecular sieve extraction processes appreciably increases the capacity decay rate of this sieve. Iron-containing particles may be present in hydrocarbon feedstocks for various reasons, for example corrosion or erosion of iron or steel pipelines or plant vessels through which the feedstock has been passed. Such iron-containing particles may be present only in very small amounts, for example of the order of 1 p.p.m., and yet have an appreciable effect on the sieve activity. The iron particles are frequently present as very small particles, almost colloidal, and are consequently difficult to remove by ordinary filtration techniques.

In order to carry out the invention a filter of very fine pore size should be used, preferably of pore diameter not exceeding $0.45\mu$. Suitable filters of this size are commercially available, and one such type which is particularly suitable for carrying out the invention is a cellulose type filter sold under the name "Millipore" (registered trade mark).

The filtration step may be operated at any convenient temperature although ambient temperature is preferred.

The process of the present invention may be used in any molecular sieve separation process in which deactivation of the sieve is accelerated by the presence of discrete, iron-containing particles in the feedstock. For example, a process for the treatment of a petroleum fraction boiling in the $C_{10}$–$C_{20}$ range is described in our co-pending U.K. patent application No. 3,965/61. This process is isothermal and comprises contacting the $C_{10}$–$C_{20}$ fraction with a 5 A. molecular sieve in a first stage to absorb straight-chain hydrocarbons, contacting the sieve with a purging medium in a second stage to remove material absorbed on the surface of the sieve or held interstitially between sieve particles, desorbing the absorbed hydrocarbons in a third stage using either n-pentane or n-butane as desorbing medium, all three stages being in the vapour phase, the pressure in the desorption stage being equal to, or greater than, the pressure in the absorption stage, and recovering the desorbed straight chain hydrocarbons in a purity of at least 95% wt.

The invention is illustrated by means of the following comparative examples:

*Example 1*

A $C_{10}$–$C_{13}$ hydrofined petroleum fraction was treated with a 5 A. molecular sieve in a three stage process under the conditions set out in the following Table 1:

TABLE 1

| Stage | Feedstock | Temp., °C. | Pressure, p.s.i.g. | Rate | Period |
|---|---|---|---|---|---|
| Absorption | $C_{10}$–$C_{13}$ fraction | 380 | 0 | 0.25 LHSV | Sufficient to achieve saturation. |
| Purge | Nitrogen | | | 120 GHSV | 60 mins. |
| Desorption | Normal Heptane | | | 1.0 GHSV | 60 mins. |

The molecular sieve process was carried out on unfiltered feedstock and also on feedstock filtered through a Millipore type HA filter having pore diameters of the order of $0.45\mu$. The reduction of the iron content gave a marked decrease in the sieve capacity decay rate as indicated in the following Table 2:

TABLE 2

| No. | Feedstock | Before/After Filtration | Iron Content, p.p.m. | Capacity Decay Rate, g./100 g. s./1,000 HOS |
|---|---|---|---|---|
| 1 | $C_{10}$–$C_{13}$ hydrofined fraction | Before | 0.75 | 1.9 |
| 2 | $C_{10}$–$C_{13}$ hydrofined fraction | After | 0.07 | 0.4 |

*Example 2*

A $C_{10}$–$C_{13}$ $SO_2$ treated petroleum fraction was treated under the same conditions as in Example 1. The effect of iron reduction on capacity decay rate is indicated in the following Table 3:

TABLE 3

| No. | Feedstock | Before/After Filtration | Iron Content, p.p.m. | Capacity Decay Rate, g./100 g. s./1,000 HOS |
|---|---|---|---|---|
| 3 | $C_{10}$–$C_{13}$ $SO_2$-treated fraction | Before | 1.2 | 3.0 |
| 4 | | After | 0.04 | 0.2 |

I claim:
1. A process for the separation of straight chain hydrocarbons from petroleum fractions boiling in the $C_{10}$–$C_{20}$ range and containing discrete iron-containing particles which comprises passing the feedstock through the filter means to remove the iron-containing particles from the feedstock, passing the substantially iron free feedstock through 5 A. molecular sieve means and recovering straight chain hydrocarbons.
2. A process as claimed in claim 1 wherein the feedstock is contacted with a cellulose filter having a pore diameter not greater than 0.45.

References Cited by the Examiner
UNITED STATES PATENTS 2,944,092  7/1960  Feldbauer et al. ____ 260—676
2,966,531  12/1960  Louis _____ 260—676
3,094,569  6/1963  Thomas _____ 208—310

ALPHONSO D. SULLIVAN, *Primary Examiner.*